(12) United States Patent
Jin et al.

(10) Patent No.: US 11,496,057 B2
(45) Date of Patent: *Nov. 8, 2022

(54) CONVERTER FOR IMPROVING CONVERSION EFFICIENCY

(71) Applicant: DELTA ELECTRONICS, INC., Taoyuan (TW)

(72) Inventors: Da Jin, Taoyuan (TW); Ya-Hong Xiong, Taoyuan (TW); Qing-Hua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 51 days.

This patent is subject to a terminal disclaimer.

(21) Appl. No.: 16/748,766

(22) Filed: Jan. 21, 2020

(65) Prior Publication Data

US 2020/0251998 A1 Aug. 6, 2020

(30) Foreign Application Priority Data

Feb. 1, 2019 (CN) .................. 201910104778.X

(51) Int. Cl.
*H02M 3/335* (2006.01)
*H02M 1/00* (2006.01)
*H02M 3/00* (2006.01)

(52) U.S. Cl.
CPC ......... *H02M 3/33573* (2021.05); *H02M 3/01* (2021.05); *H02M 3/33571* (2021.05); *H02M 3/33576* (2013.01); *H02M 1/0058* (2021.05)

(58) Field of Classification Search
CPC ........... H02M 1/38; H02M 2001/0058; H02M 1/0058; H02M 1/0038
See application file for complete search history.

(56) References Cited

U.S. PATENT DOCUMENTS 4,383,292 A * 5/1983 Onodera ............... H02M 3/335
363/21.04
5,939,844 A * 8/1999 Shiomi .................... H04N 3/27
315/411

(Continued)

FOREIGN PATENT DOCUMENTS

CN 1614863 A 5/2005
CN 101399492 A 4/2009
(Continued)

*Primary Examiner* — Gustavo A Rosario-Benitez
(74) *Attorney, Agent, or Firm* — CKC & Partners Co., LLC

(57) ABSTRACT

A converter includes an input capacitor, a primary-side switching circuit, a magnetic element circuit, a secondary-side switching circuit, and an output capacitor. The magnetic element circuit includes a transformer and an inductor. The input capacitor is configured to receive an input voltage. The primary-side switching circuit is coupled to the input capacitor. The magnetic element circuit is coupled to the primary-side switching circuit. The secondary-side switching circuit is coupled to the magnetic element circuit. The output capacitor is coupled to the secondary-side switching circuit. The input capacitor, the inductor, and the output capacitor oscillate to generate an oscillating current. The primary-side switching circuit is switched between a peak point of the oscillating current and a valley point of the oscillating current.

16 Claims, 11 Drawing Sheets

(56) References Cited

U.S. PATENT DOCUMENTS

| | | | |
|---|---|---|---|
| 7,149,097 B1* | 12/2006 | Shteynberg | H02M 1/4258 363/16 |
| 7,184,280 B2* | 2/2007 | Sun | H02M 3/3376 363/21.02 |
| 8,456,867 B1 | 6/2013 | Karlsson et al. | |
| 9,116,488 B2* | 8/2015 | Shinohara | G03G 15/5062 |
| 9,621,053 B1* | 4/2017 | Telefus | H02M 3/33507 |
| 10,819,222 B2* | 10/2020 | Scherbaum | H02M 1/4241 |
| 2003/0090914 A1* | 5/2003 | Jansen | H02M 3/33576 363/21.12 |
| 2009/0244934 A1* | 10/2009 | Wang | H02M 3/33592 363/21.06 |
| 2011/0194206 A1* | 8/2011 | Sase | H02M 3/33592 360/75 |
| 2011/0221279 A1* | 9/2011 | Ratnaparkhi | H02M 5/4585 307/151 |
| 2012/0262954 A1* | 10/2012 | Duvnjak | H02M 1/4258 363/21.02 |
| 2014/0009968 A1* | 1/2014 | Matsuura | H02M 3/33592 363/17 |
| 2014/0268891 A1* | 9/2014 | Sigamani | H02M 3/285 363/17 |
| 2014/0286056 A1* | 9/2014 | Yoon | H02M 3/33569 363/21.03 |
| 2016/0359419 A1* | 12/2016 | Lin | H02M 1/40 |
| 2017/0179831 A1* | 6/2017 | Yu | H02M 3/33569 |
| 2017/0244330 A1* | 8/2017 | Kolar | H02M 3/3376 |
| 2017/0294844 A1* | 10/2017 | Nishijima | H02M 1/44 |
| 2018/0131285 A1 | 5/2018 | Stuler | |
| 2020/0251999 A1* | 8/2020 | Jin | H02M 3/3376 |

FOREIGN PATENT DOCUMENTS

| | | |
|---|---|---|
| CN | 102185493 A | 9/2011 |
| CN | 102761276 A | 10/2012 |
| CN | 20273/111 U | 2/2013 |
| CN | 103532390 A | 1/2014 |
| CN | 103762840 A | 4/2014 |
| CN | 104300769 A | 1/2015 |
| CN | 105934876 A | 9/2016 |
| CN | 107171563 A | 9/2017 |
| CN | 108667384 A | 10/2018 |
| EP | 2458723 A1 | 5/2012 |
| TW | 200713677 A | 4/2007 |

* cited by examiner

CONVERTER FOR IMPROVING CONVERSION EFFICIENCY

RELATED APPLICATIONS

This application claims priority to Chinese Application Serial Number 201910104778.X, filed Feb. 1, 2019, which is herein incorporated by reference.

BACKGROUND

Technical Field

The present disclosure relates to a voltage conversion device. More particularly, the present disclosure relates to a converter.

Description of Related Art

In order to increase the efficiency of a conversion system, a bus converter usually uses an unadjusted scheme of 54V to 12V. For example, the switch operates at a fixed Duty cycle, that is, the maximum Duty cycle, so that the advantages of maximum Duty cycle, minimum current effective value, smallest filter can be obtained. The circuit topology commonly used for the above bus converter has a full bridge circuit on its primary side, and a center-tapped full wave rectifier circuit on its secondary side.

The above bus converter belongs to a topology of a traditional pulse width modulation (PWM) switching circuit. This kind of switching circuit has a large switching loss. At the same time, the reverse recovery loss of the full wave rectifier switching transistor is large. As a result, the switching frequency of the converter is low. A higher switching frequency can not be adopted to shrink the size of the transformer, and the output inductor is also bulky. Additionally, in traditional applications, the air gap of the transformer is usually reduced as much as possible to decrease the loss caused by the magnetizing current of the transformer. The value of the magnetizing inductance is thus close to infinity, which makes the voltage across two terminals of the switch high when the switch is turned on. The turn-on loss is large.

For the foregoing reasons, there is a need to solve the above-mentioned problems by providing a converter, which satisfies the needs for high efficiency and high power density of a converter.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

A converter is provided. The converter includes an input capacitor, a primary-side switching circuit, a magnetic element circuit, a secondary-side switching circuit, and an output capacitor. The primary-side switching circuit has a switching period and a switching frequency. The magnetic element circuit includes a transformer and an inductor. The input capacitor is configured to receive an input voltage. The primary-side switching circuit is coupled to the input capacitor. The magnetic element circuit is coupled to the primary-side switching circuit. The secondary-side switching circuit is coupled to the magnetic element circuit. The output capacitor is coupled to the secondary-side switching circuit. The input capacitor, the inductor, and the output capacitor oscillate to generate an oscillating current during the switching period. The status of the primary-side switching circuit is switched between a peak point of the oscillating current and a valley point of the oscillating current.

Therefore, the embodiments of the present disclosure provide a converter to improve the problems of low switching frequency of the converter, being unable to adopt a higher switching frequency to shrink the size of the transformer, and the bulky output inductor. In addition, the high voltage across two terminals of the switch when the switch is turned on and the large turn-on loss are improved. As a result, the needs for high efficiency and high power density of a converter are satisfied.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DETAILED DESCRIPTION

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" refers to direct physical contact or electrical contact or indirect physical contact or electrical contact between two or more elements. Or it can also refer to reciprocal operations or actions between two or more elements.

Figure 1:
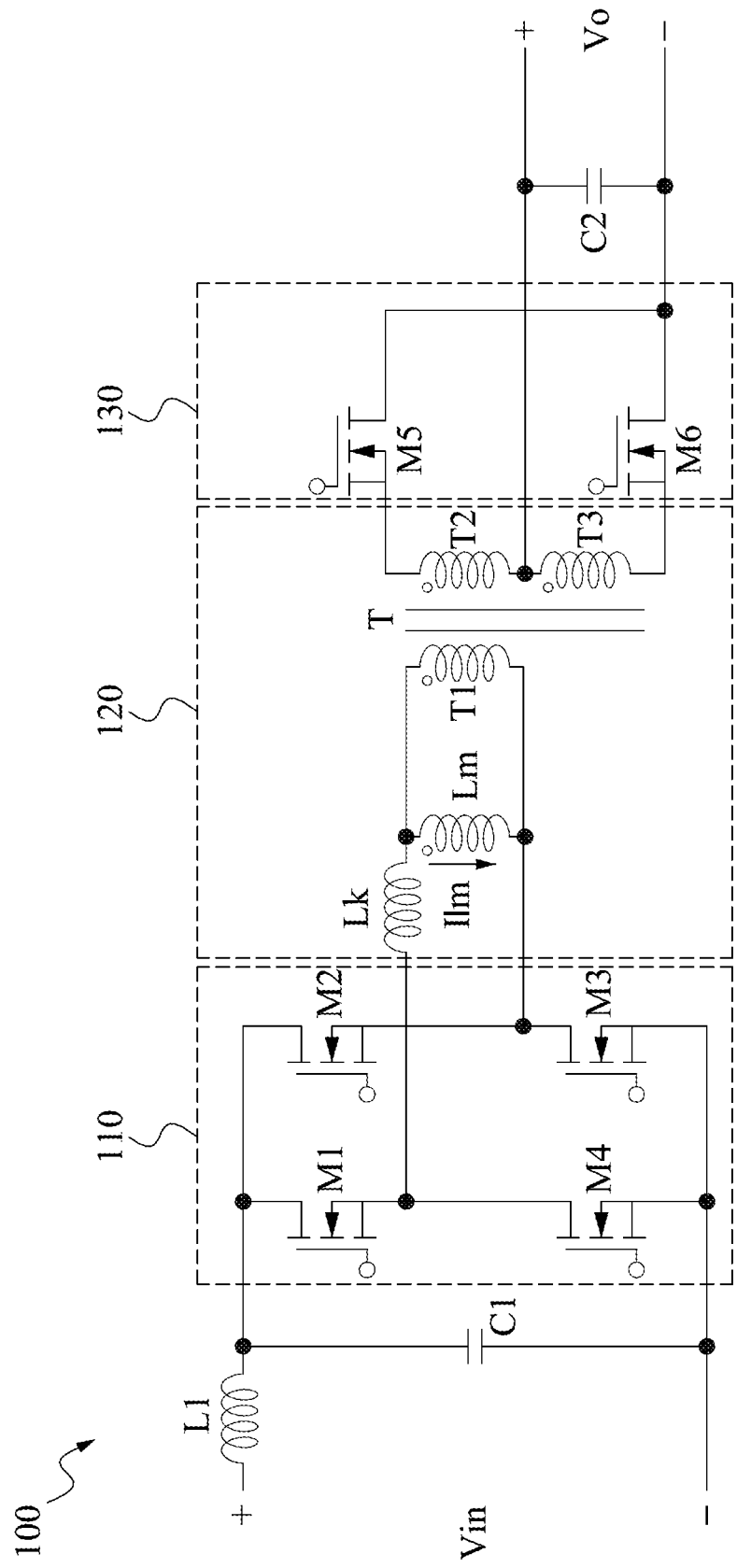
FIG. 1 depicts a schematic diagram of a circuit of a converter according to one embodiment of the present disclosure.

FIG. 1 depicts a schematic diagram of a circuit of a converter 100 according to one embodiment of the present disclosure. As shown in the figure, the converter 100 includes an input inductor L1, an input capacitor C1, a primary-side switching circuit 110, a magnetic element circuit 120, a secondary-side switching circuit 130, and an output capacitor C2. In addition, the magnetic element circuit 120 includes a transformer T and an inductor. The inductor may be a leakage inductor of the transformer or an inductor independent from the transformer.

The primary-side switching circuit 110 is coupled to the input inductor L1 and the input capacitor C1. The magnetic element circuit 120 is coupled to the primary-side switching circuit 110. The secondary-side switching circuit 130 is coupled to the magnetic element circuit 120. The output capacitor C2 is coupled to the secondary-side switching circuit 130.

In the present embodiment, the primary-side switching circuit 110 is a full-bridge power circuit, and the secondary-side switching circuit 130 is a full wave rectifier circuit. In addition, a primary-side winding of the transformer includes a winding T1, and at least one secondary-side winding of the transformer includes at least two windings T2, T3. The at least two windings T2, T3 are connected in series with each other, and a connection point of the at least two windings T2, T3 includes a center tap. The at least one secondary-side winding of the transformer and the secondary-side switching circuit 130 form a center-tapped full wave rectifier circuit. Additionally, the magnetic element circuit 120 includes at least one inductor. The inductor may be a leakage inductor Lk of the transformer of the magnetic element circuit 120. In the present embodiment, a capacitance value of the input capacitor C1 is adjusted depending on practical needs so that it can generate an oscillating current together with the leakage inductor Lk. However, the present disclosure is not limited to the structure shown in FIG. 1, which is only used to illustrate one of the implementation methods of the present disclosure by taking an example.

Figure 2:
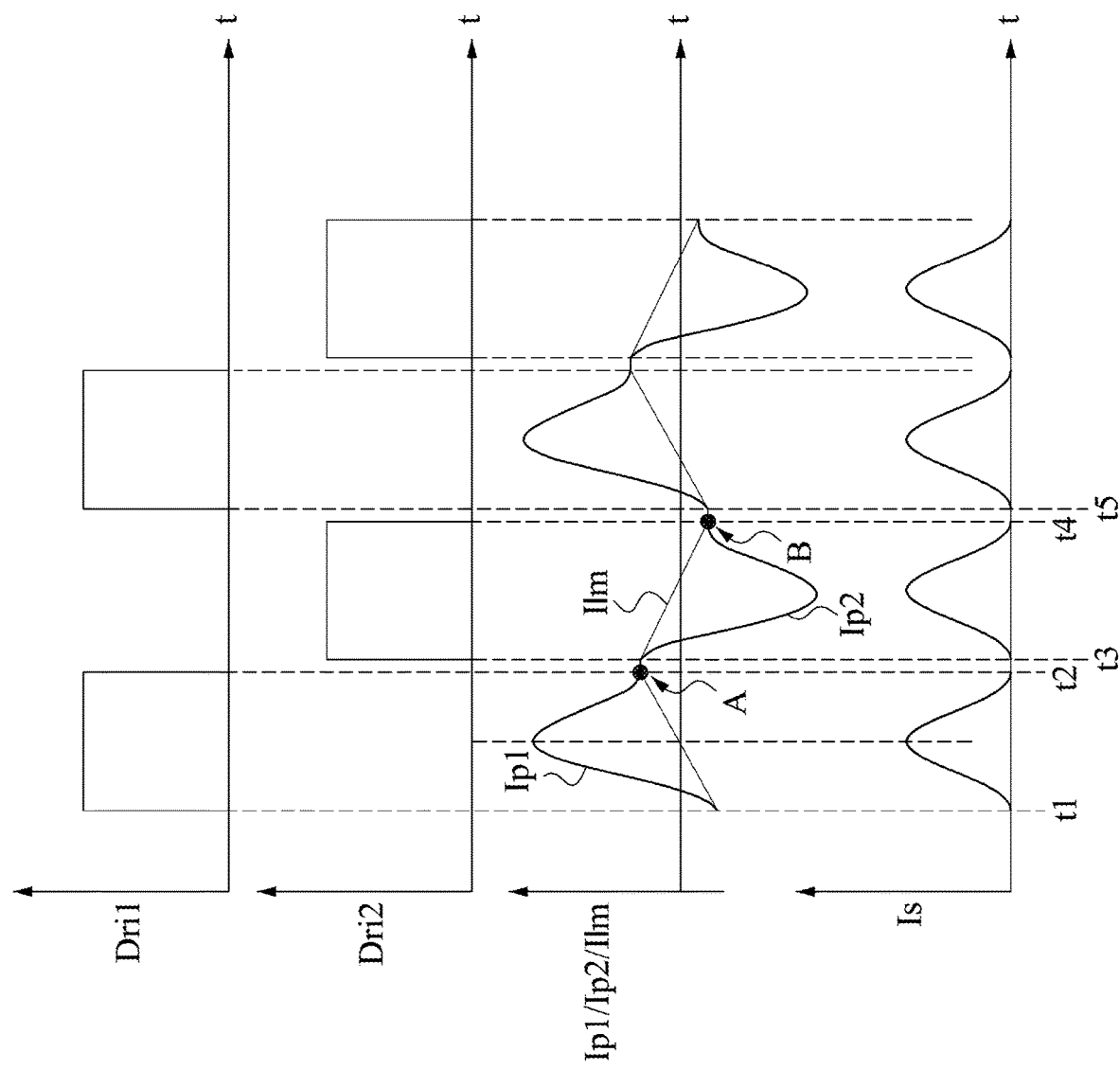
FIG. 2 depicts a schematic diagram of drive waveforms of a converter according to one embodiment of the present disclosure.

In one embodiment, a description is provided with reference to FIG. 1 and FIG. 2. FIG. 2 depicts a schematic diagram of drive waveforms of the converter 100 according to one embodiment of the present disclosure. The input inductor L1 and the input capacitor C1 are configured to receive an input voltage Vin. The primary-side switching circuit has a switching period and a switching frequency. During the switching period, the input capacitor C1 and the inductor Lk can oscillate to generate oscillating currents Ip1, Ip2. The switching status of the primary-side switching circuit 110 is switched at adjacent regions of wave valleys of the oscillating currents Ip1, Ip2.

In greater detail, a drive signal Dri1 is configured to control switches M1, M3 of the primary-side switching circuit 110 and a switch M5 of the secondary-side switching circuit 130. A drive signal Dri2 is configured to control switches M2, M4 of the primary-side switching circuit 110 and a switch M6 of the secondary-side switching circuit 130. Duty cycles of the drive signal Dri1 and the drive signal Dri2 are substantial 50%, and there are dead zones between the drive signal Dri1 and the drive signal Dri2. In the present embodiment, through reducing the capacitance value of the input capacitor C1, the input capacitor C1 and the leakage inductor Lk oscillate to generate the oscillating currents during durations t1-t2 and t3-t4 of the drive signals Dri1, Dri2. For example, during the duration t1-t2, the drive signal Dri1 is a high level signal. At this time, the switches M1, M3, M5 are turned on, the input capacitor C1 and the leakage inductor Lk oscillate to generate the oscillating current Ip1. The oscillating current Ip1 is a current flowing through the switches of the primary-side switching circuit 110.

When the oscillating current Ip1 falls to a point A of a valley at time t2, the switching is performed. In detailed description, the drive signal Dri1 is switched to a low level signal, and the switches M1, M3, and M5 are turned off. The drive signal Dri1 is switched at this time point where the oscillating current Ip1 is adjacent to the magnetizing current Ilm of an magnetizing inductor Lm of the transformer.

During the duration t3-t4, the drive signal Dri2 is the high level signal and the switches M2, M4, M6 are turned on, and the input capacitor C1 and the leakage inductor Lk oscillate to generate the oscillating current Ip2. The oscillating current Ip2 is a current flowing through the switches of the primary-side switching circuit 110. When the oscillating current Ip2 falls to a point B of a valley at time t4, the switching is performed. The drive signal Dri2 is switched to the low level signal, and the switches M2, M4, and M6 are turned off. The drive signal Dri2 is switched at this time point where the oscillating current Ip2 is adjacent to the current Ilm of the magnetizing inductor Lm of the transformer.

Based on the above operating method of the converter 100, the converter 100 will generate a secondary-side current Is in the secondary-side switching circuit 130, and the secondary-side current Is is a sinusoidal wave. As a result, a current pulse that is instantaneously generated when the switches are switched (for example, the switches are turned on) is eliminated to effectively reduce the turn-on loss. Additionally, the requirements of practical applications can be satisfied without adding an output inductor to the converter 100. At the same time, the switches can be turned off when the oscillating currents Ip1, Ip2 of the primary-side switching circuit 110 are close to the current Ilm of the magnetizing inductor Lm, thus reducing the turn-off loss of the switches.

Figure 3:
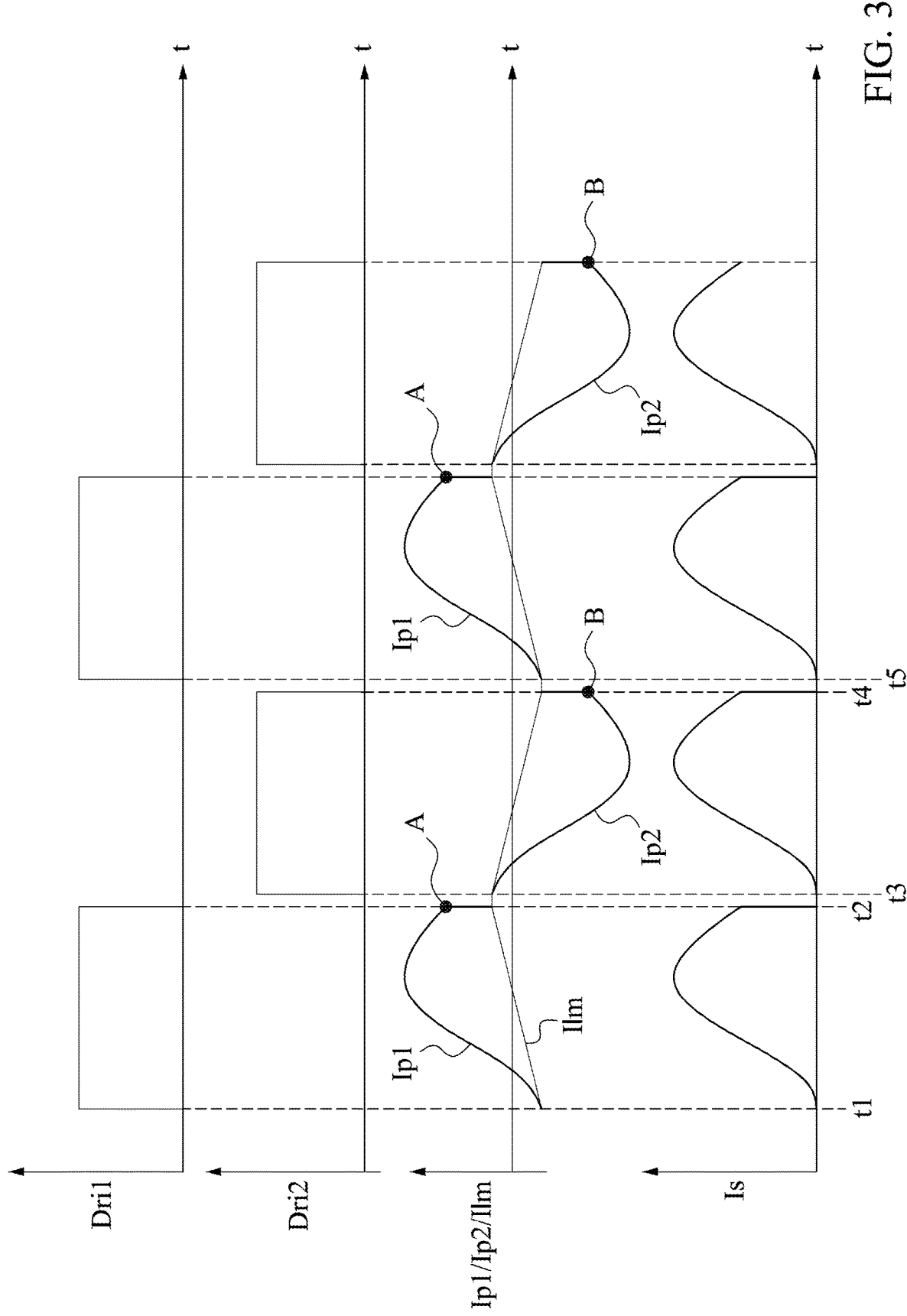
FIG. 3 depicts a schematic diagram of drive waveforms of a converter according to one embodiment of the present disclosure.

In another embodiment, a description is provided with reference to FIG. 1 and FIG. 3. FIG. 3 depicts a schematic diagram of drive waveforms of the converter 100 according to one embodiment of the present disclosure. The input inductor L1 and the input capacitor C1 are configured to receive the input voltage Vin. The input capacitor C1, the inductor Lk, and the output capacitor C2 oscillate to generate oscillating currents by turning on and turning off of the primary-side switching circuit 110. Each of the oscillating currents has an oscillating period. The primary-side switching circuit 110 is switched between a peak point and a valley point of each of the oscillating currents. A relationship between a switching frequency $f_{SW}$ of the primary-side switching circuit 110 and an oscillating frequency $f_{LC}$ is $f_{SW} \leq f_{LC} \leq 2 \cdot f_{SW}$, here the oscillating frequency is used to illustrate its relationship with the switching frequency. However, in practical prototype manufacturing or industry manufacturing, first the oscillating frequency $f_{LC}$ of the primary-side switching circuit 110 needs to be determined, then the switching frequency $f_{SW}$ of the primary-side switching circuit 110 is adjusted so that the switching frequency $f_{SW}$ satisfies the relationship of $0.5 f_{LC} \leq f_{SW} \leq f_{LC}$. Here the oscillating frequency is determined by the inductor Lk, the input capacitor C1, and the output capacitor C2, and the relationship is as follows:

$$f_{LC} = \frac{1}{2 \cdot \pi \sqrt{L_k \cdot \frac{C_1 \cdot \frac{C_2}{N^2}}{C_1 + \frac{C_2}{N^2}}}} \quad (1\text{-}1)$$

Here, N is a turn ratio of the primary-side winding to the secondary-side winding of the transformer.

In greater detail, a numerical range of an inductance value of the inductor Lk is related to the input voltage and the output power of the converter in this type of converter application, and the relationship is as follows:

$$L_k \leq k_L \frac{V_{in}^2}{V_o \cdot P_o} \quad (1\text{-}2)$$

Here, Vin is the input voltage of the converter, Po is the output power of the converter, and $k_L$, is a coefficient and $k_L = 150 \times 10^{-9}$. In the present disclosure, a planar transformer can be utilized to allow the inductance value of the leakage inductor Lk of the transformer in the magnetic element circuit 120 to be as small as possible in the range described in formula 1-2. At this time, the capacitance value of the input capacitor C1 can be correspondingly increased and an inductance value of the input inductor L1 can be correspondingly decreased to reduce voltage ripples at two terminals of the input capacitor C1. In the present embodiment, the input capacitor C1 can adopt by an X7R capacitor but is not limited thereto. This type of capacitor has a smaller volume and its capacitance distribution is >10%. In other embodiments, in order to achieve a good filtering effect and at the same time not to affect the oscillation of the leakage inductor Lk of the transformer, the input capacitor C1, and the output capacitor C2, the inductance value of the input inductor L1 needs to be greater than or equal to 5 times the inductance value of the leakage inductor Lk of the transformer. However, the present disclosure is not limited in this regard, which is only used to illustrate one of the implementation methods of the present disclosure by taking an example.

In addition to that, the capacitance value of the input capacitor C1 needs to be designed so that $f_{SW} \leq f_{LC} \leq 2 \cdot f_{SW}$. Here, $f_{LC} = \frac{3}{2} \cdot f_{SW}$ (that is, $f_{SW} = \frac{2}{3} \cdot f_{LC}$) is taken as an example to illustrate the working principle of the present embodiment. A description is provided with reference to FIG. 1 and FIG. 3. During the duration of t1-t2, the drive signal Dri1 is a high level signal. The switches M1, M3, M5 are turned on. The input capacitor C1, the output capacitor C2, and the leakage inductor Lk of the transformer oscillate to generate the oscillating current Ip1. The oscillating current Ip1 is a current flowing through the switches of the primary-side switching circuit 110. Here, the capacitance value of the input capacitor C1 can be configured to be similar to a capacitance value of the output capacitor C2. The input capacitor C1 and the output capacitor C2 are connected in parallel and then participle the oscillation together. At time t2, the oscillating current Ip1 oscillates to the point A, which is when $f_{LC} = \frac{3}{2} \cdot f_{SW}$. The drive signal Dri1 is switched to a low level signal, and the switches M1, M3, and M5 are turned off. During the duration t3-t4, the drive signal Dri2 is the high level signal and the switches M2, M4, M6 are turned on. Similarly, the input capacitor C1, the output capacitor C2, and the leakage inductor Lk of the transformer oscillate to generate the oscillating current Ip2. At time t4, the oscillating current Ip2 reaches to the current value at the point B. The drive signal Dri2 is switched to the low level signal, and the switches M2, M4, and M6 are turned off. Here, the oscillating currents Ip1 and Ip2 are not equal to the magnetizing current Ilm of the magnetizing inductor Lm, and the current in the leakage inductor is high when turning off the switches. The calculation formula of the loss caused by the current in the leakage inductor when turning off the switches is as follows:

$$P_{lk} = 2 f_{sw} \cdot \frac{L_k}{2} \cdot (I_p^2 - I_{lm}^2) \quad (1\text{-}3)$$

Here, $P_{lk}$ is a turn-off loss of the switches. Ip is the primary oscillating current and may be Ip1 or Ip2. Ilm is the magnetizing current flowing through the magnetizing inductor of the transformer.

The inductance value of the leakage inductor Lk of the transformer in formula 1-3 is proportional to the turn-off loss $P_{lk}$. Since the inductance value of the leakage inductor Lk of the transformer according to the present embodiment is smaller, the turn-off loss $P_{lk}$ is also very small although Ip>Ilm. The conversion efficiency of the converter 100 is not affected.

Figure 4:
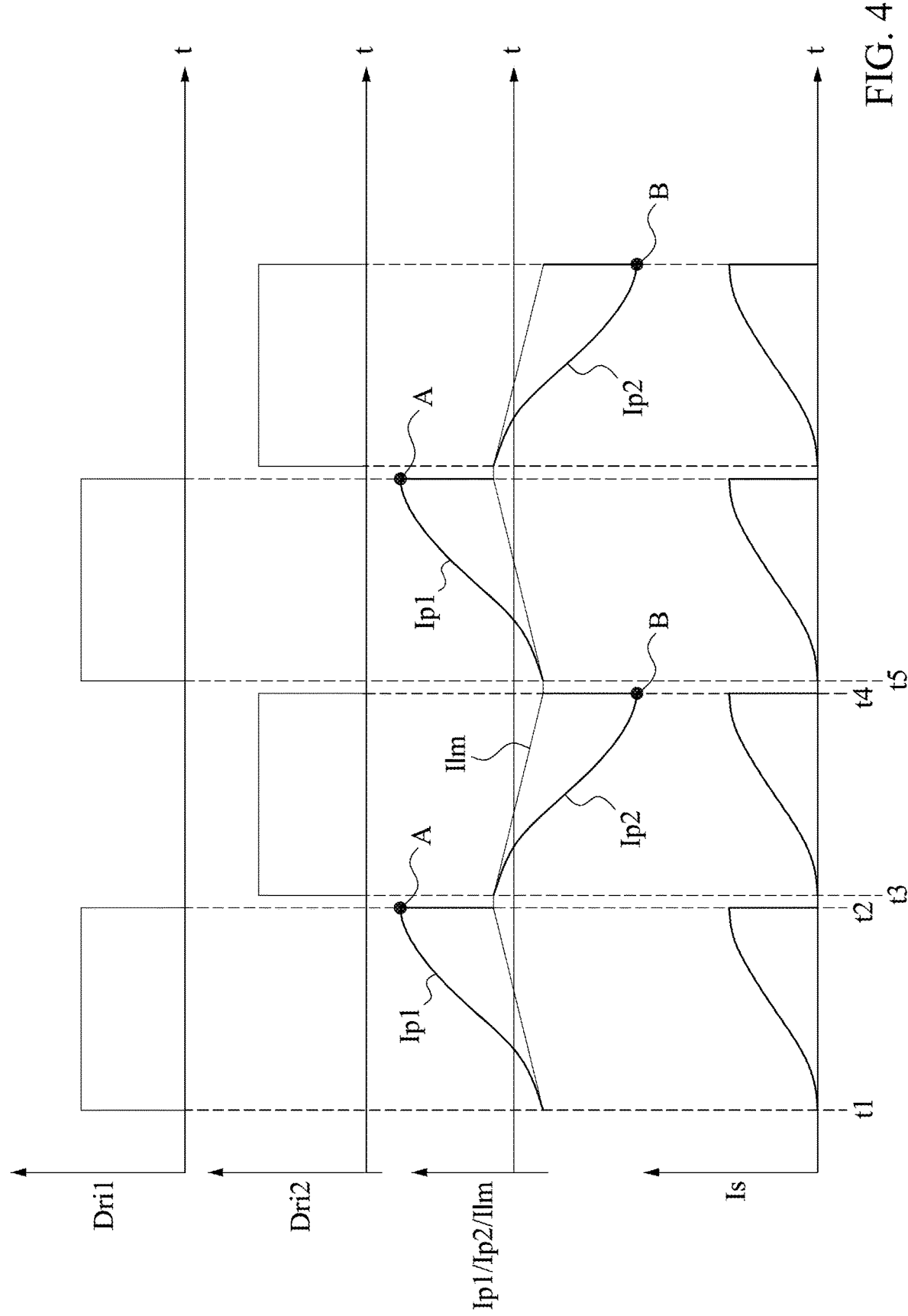
FIG. 4 depicts a schematic diagram of drive waveforms of a converter according to one embodiment of the present disclosure.

In another embodiment, a description is provided with reference to FIG. 1 and FIG. 4. FIG. 4 depicts a schematic diagram of drive waveforms of the converter 100 according to one embodiment of the present disclosure. As shown in the figure, if the turn-off points of the switch, that is, the points A and B, are the peak points of the oscillating currents, that is, $f_{LC} = f_{SW}$, the primary current Ip is the highest when the switches are turned off. Under this circumstance, the turn-off loss $P_{lk}$ is slightly larger than the turn-off off loss when $f_{LC} = \frac{3}{2} \cdot f_{SW}$. However, since the inductance value of the leakage inductor Lk of the transformer according to the present embodiment is smaller, the turn-off loss $P_{lk}$ of the switches is also very small. The conversion efficiency of the converter 100 is not affected.

In still another embodiment, the turn-off points of the switch, that is, the points A and B, can be moved to valley points of the oscillating currents, that is, $f_{LC}=2f_{SW}$ (in other words, $f_{SW}=0.5f_{LC}$) to perform switching. The working principle and figures may be referred to FIG. 1 and FIG. 2, but the difference lies in that the input capacitor C1, the inductor Lk, and the output capacitor C2 oscillate to generate the oscillating current according to the present embodiment.

Since the capacitance values of the input capacitor C1 and the output capacitor C2 in the converter 100 and the inductance value of the leakage inductor Lk of the transformer are all distributed parameters, the oscillating frequency generated by the cooperation of the three is also a distributed parameter. Therefore, there is a distribution of the turn-off points, that is, the points A and B in mass production, and their distributions are related to the distributions of the capacitance values of the input capacitor C1 and the output capacitor C2 and the distribution of the inductance value of the leakage inductor Lk of the transformer. In greater detail, owing to the distributions of the turn-off points of the switch, that is, the points A and B, the loss deviations are proportional to the currents and the inductance values of the leakage inductor Lk at the moment when the switch is turned off. Because the inductance value of the leakage inductor Lk according to the present disclosure is very small, the current distribution at the turn-off point of the switch caused by the capacitance distribution of the input capacitor C1 does not result in a large loss distribution. As a result, a capacitor having a low cost and small size but a large distribution (for example, X7R that has a distribution ≥10%) can be applied as the input capacitor C1 in the present embodiment. The conversion efficiency of the converter is not affected when the cost and size of the converter are reduced.

In the present embodiment, through further decreasing the inductance value of the leakage inductor Lk of the transformer, the capacitance value of the input capacitor C1 is increased so as to reduce voltage ripples at two terminals of the input capacitor C1. At the same time, decreasing the inductance value of the input inductor L1 can shrink the size of the input inductor L1. In addition to that, the capacitance value of the output capacitor C2 can be increased at the same time, that is, the size of the output capacitor C2 is shrank. As a result, the size of the converter is further shrunk, the cost of the converter is reduced, and the power density of the converter is increased.

Figure 5:
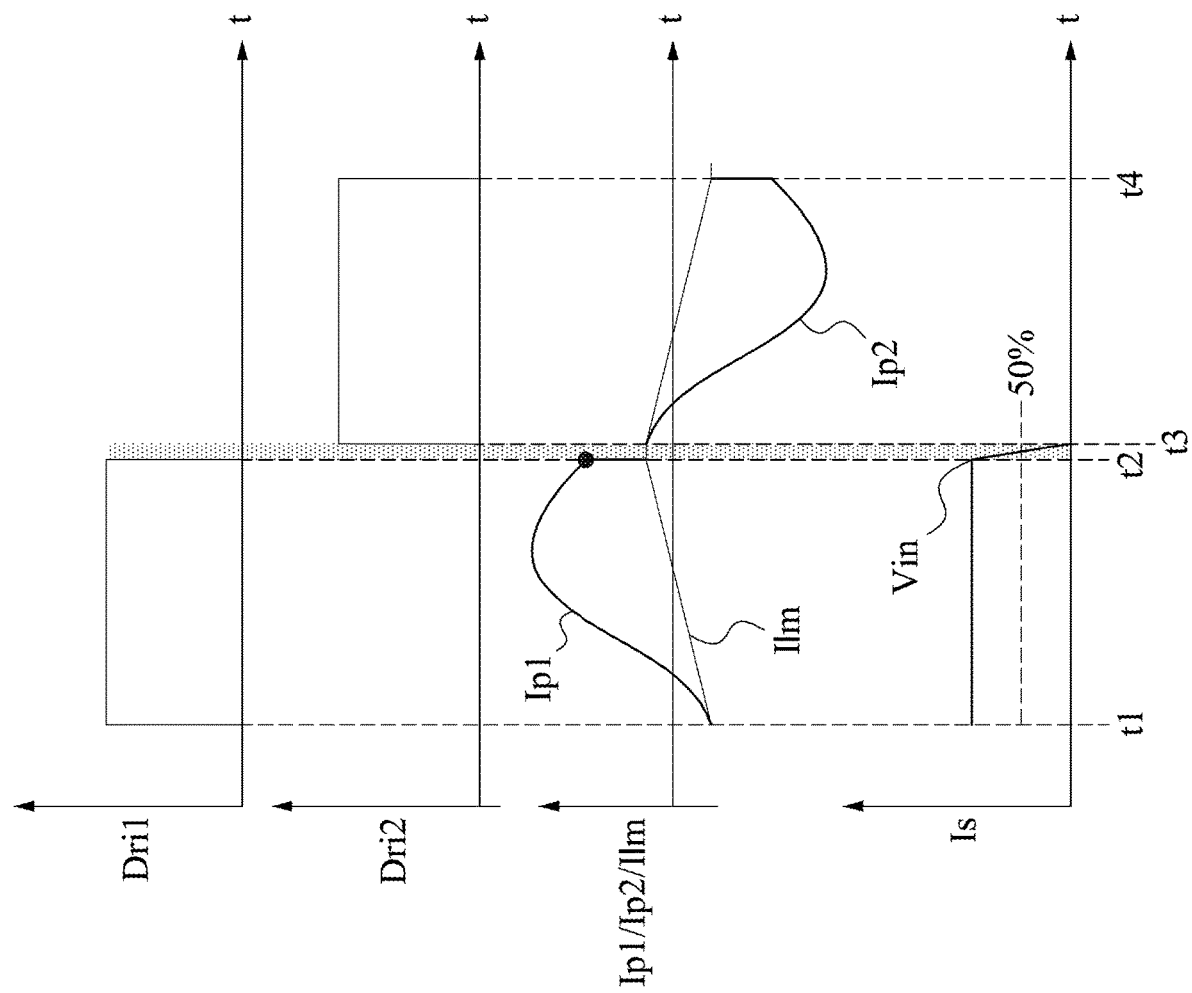
FIG. 5 depicts a schematic diagram of drive waveforms of a converter according to one embodiment of the present disclosure.

FIG. 5 depicts a schematic diagram of drive waveforms of the converter 100 according to one embodiment of the present disclosure. A description is provided with reference to FIG. 1 and FIG. 5. The magnetizing current Ilm shown in FIG. 1 can be adjusted through adjusting an air gap of the converter 100. For example, in the duration t2-t3 of the dead zone, the magnetizing current Ilm extracts charges on parasitic capacitors of switches of the primary-side switching circuit 110 in another set of switches (such as the switches M2 and M4), so that a voltage Vds across two terminals of one of the switches drops until the voltage across two terminals of the one of the switches is less than or equal to half the input voltage Vin. At this time, the drive signal Dri2 turns on the another set of switches M2, M4, M6. As a result, the turn-on loss of the switches can be reduced, and the energy conversion efficiency and power density of the converter 100 can be improved. In other embodiments, the drive signal Dri2 can turn on the another set of switches M2, M4, M6 when the voltage across two terminals of one of the switches drops to less than or equal to zero.

Figure 6A:
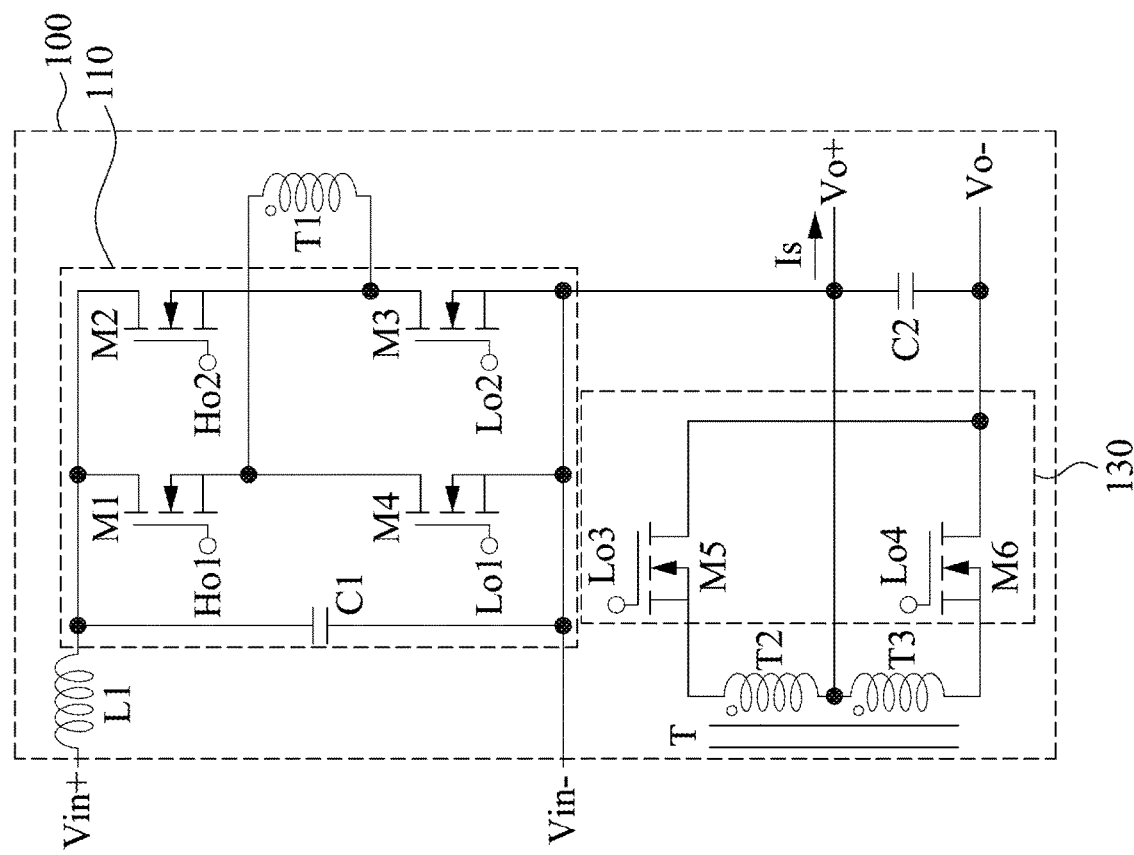
FIG. 6A depicts a schematic diagram of a circuit of a converter according to one embodiment of the present disclosure.

FIG. 6A depicts a schematic diagram of a circuit of a converter according to one embodiment of the present disclosure. The topology of the converter 100 can be a power circuit with isolation between primary and secondary sides of the transformer or non-isolation between primary and secondary sides of the transformer.

For the application in which non-isolation between primary and secondary sides, the input voltage is applied to a Vin+ terminal on the primary side and the Vo− terminal on the secondary side through shorting the Vin− terminal on the primary side with the Vo+ terminal on the secondary side. The primary current Ip flows into the load via the Vo+ terminal, thus reducing the reactive power loss of the primary current to improve the conversion efficiency of the converter. A description is provided with reference to the converter 100 in FIG. 6A. An output current Is is a total current, of which one part is the primary current that directly flows to the secondary side and the other part is the current that is transferred to the secondary side through the transformer from the primary current. Here, the duration t1-t2 is taken as an example. When the switches M1, M3, and M5 are turned on, a current flowing into the Vo− terminal from the primary side is (Ip1−Ilm), the current transferred to the secondary side through the transformer is (N−1)×(Ip1−Ilm), and the secondary current Is=N×(Ip1−Ilm). As described above, the same energy transfer can be achieved with the transformer ratio T1:T2:T3 being (N−1):1:1. The decrease of a number of winding turns of the transformer on the primary side can reduce an on-resistance of the primary winding, that is, the turn-on loss of the primary winding can be reduced to $$\frac{N-1}{N}$$

the original turn-on loss. For the secondary side, the turn-on loss of the secondary winding can be reduced to $$\left(\frac{N-1}{N}\right)^2$$

the original turn-on loss at the same time since the current flowing through the secondary side is $$\frac{N-1}{N}$$

the original secondary current. Owing to the change of the transformer ratio of the transformer caused by shorting the Vin−terminal and the Vo+ terminal, the loss of the converter is reduced at the same time to improve the conversion efficiency of the converter.

Figure 6B:
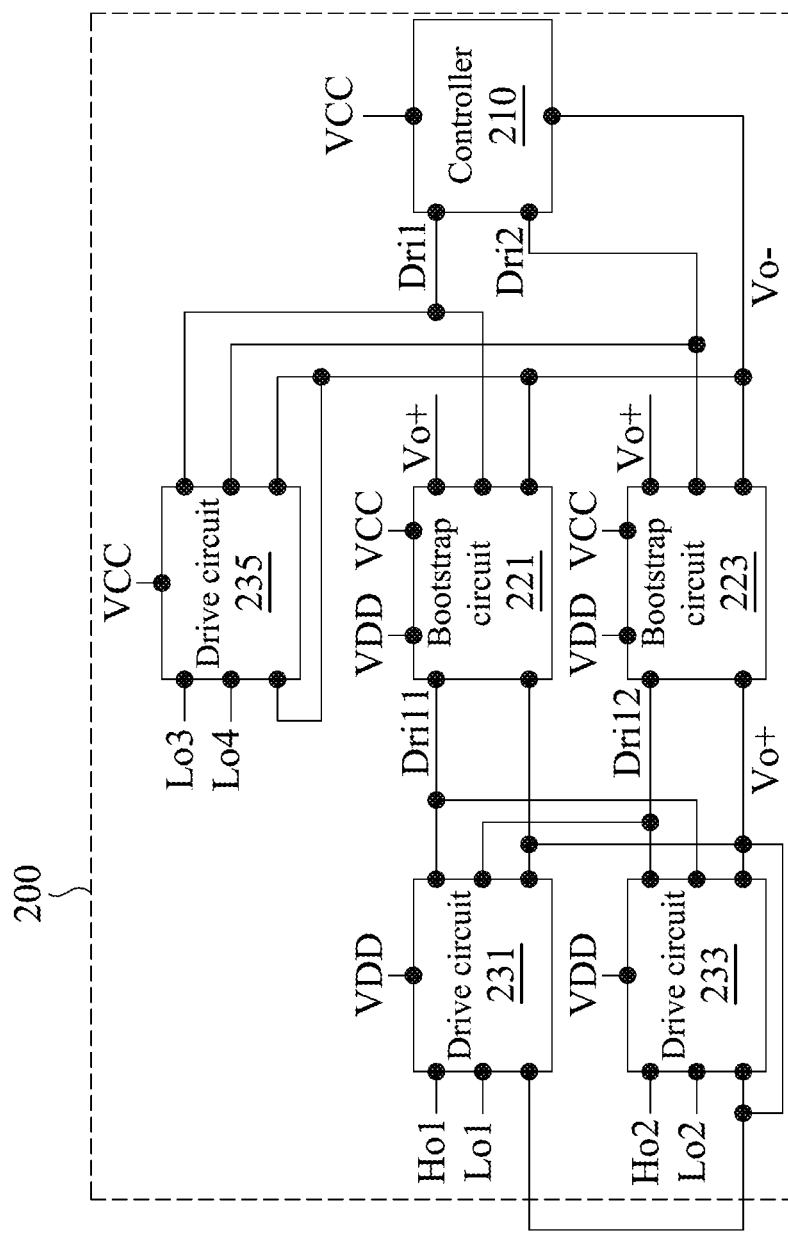
FIG. 6B depicts a schematic diagram of a circuit of a control device of a converter according to one embodiment of the present disclosure.
Figure 7:
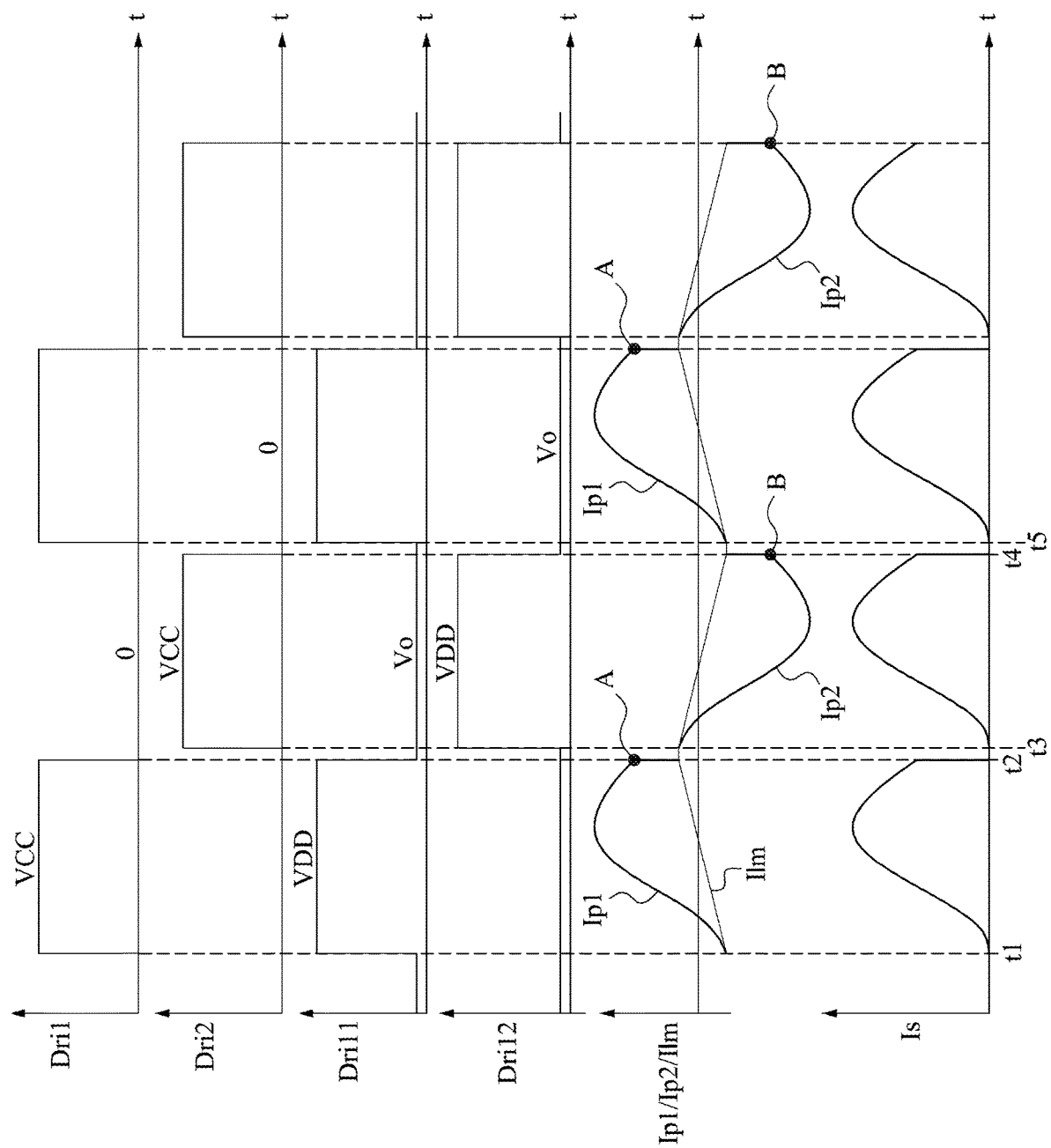
FIG. 7 depicts a schematic diagram of drive waveforms of a converter according to one embodiment of the present disclosure.

If the input voltage is connected across the Vin+ terminal and the Vo− terminal after the Vin− terminal is shorted with the Vo+ terminal, the primary and secondary switches cannot use the common ground drive mode. The drive signals for the primary switches should take the Vo+ terminal as a reference ground. In one embodiment, a description is provided with reference to the converter 100 and a control device 200 shown in FIG. 6A and FIG. 6B. Pulse width control signals Dri1 and Dri2 are pulse width control signals generated by a controller 210. The low level of the two signals is 0 and the high level of the two signals is VCC. The pulse width control signals take the Vo− terminal on the secondary side as a reference ground. The drive signals Lo3 and Lo4 can be generated through a drive circuit 235 according to the pulse width control signals Dri1 and Dri2, so as to be configured to drive the secondary switches M5 and M6 respectively. For the primary switches, it is necessary to generate a power supply signal and a control signals taking the Vo+ terminal as the reference ground which is generated by bootstrap circuits 221, 223. As shown in FIG. 6B, the control signals Dri11 and Dri12 and a power supply signal VDD is generated by the bootstrap circuits 221, 223 according to the pulse width control signals Dri1 and Dri2. The control signals Dri11 and Dri12 and the power supply signal VDD take the Vo+ terminal on the secondary side as the reference ground. Here, for ease of comparison, the pulse width of the control signals Dri11 and Dri12 are the same as that of the pulse width control signals Dri1 and Dri2. As shown in FIG. 7, the low level of the control signals Dri11 and Dri12 is Vo and the high level of the control signals Dri11 and Dri12 is VDD. Here, a voltage value of the power supply voltage VDD relative to the Vo− terminal is VCC+Vo, and Vo is a voltage difference between the Vo+ terminal and the Vo− terminal. The drive signals Ho1 and Lo2 is generated by drive circuits 231, 233 according to the control signal Dri11, so as to be configured to drive the primary switches M1 and M3 respectively. The drive signals Ho2 and Lot are generated by the drive circuits 231, 233 according to the control signal Dri12, so as to be configured to drive the primary switches M2 and M4 respectively. The "ground" terminals of the drive circuits 231, 233 are connected to the Vo+ terminal of the converter.

In the above application where the Vin− terminal is shorted with the Vo+ terminal, for the converter with the same input voltage and the same output voltage compared to the prior art converter, only the transformer ratio of the primary side to the secondary side of the transformer is changed from N:1 to (N−1):1, and the voltage and current waveforms of the main power stage of the converter are not changed.

Figure 8:
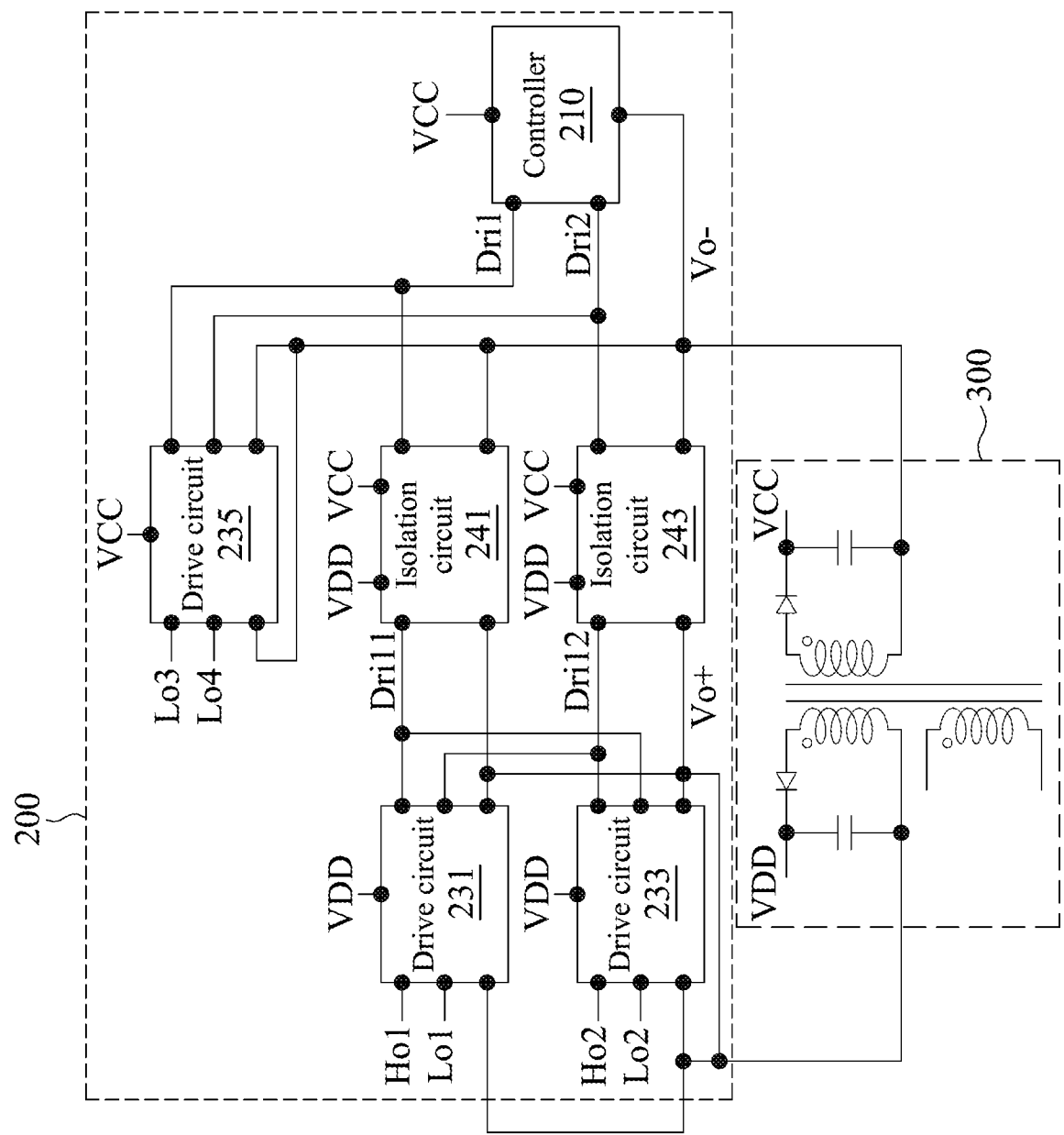
FIG. 8 depicts a schematic diagram of a circuit of a control device of a converter according to one embodiment of the present disclosure.

FIG. 8 depicts a schematic diagram of a circuit of a control device of a converter according to one embodiment of the present disclosure. As shown in FIG. 8, an isolation power supply 300 can be adopted to generate a VCC power supply and a VDD power supply. Isolation circuits 241 and 243 generate the control signals Dri11 and Dri12 based on the pulse width control signals Dri1 and Dri2. The reference ground is changed from the Vo− terminal on the secondary side to the Vo+ terminal on the secondary side. The drive circuits 231, 233, 235 here are the same as the circuits in the embodiment shown in FIG. 6A.

Figure 9A:
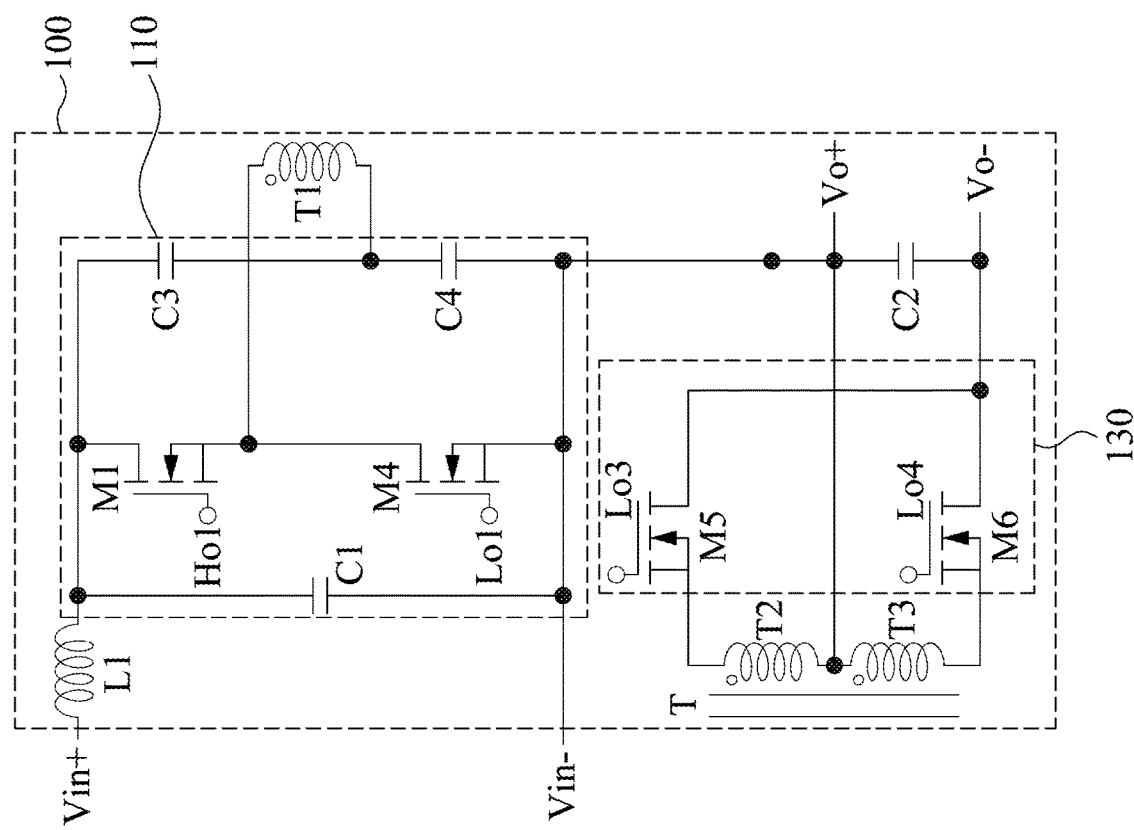
FIG. 9A depicts a schematic diagram of a circuit of a converter according to one embodiment of the present disclosure.
Figure 9B:
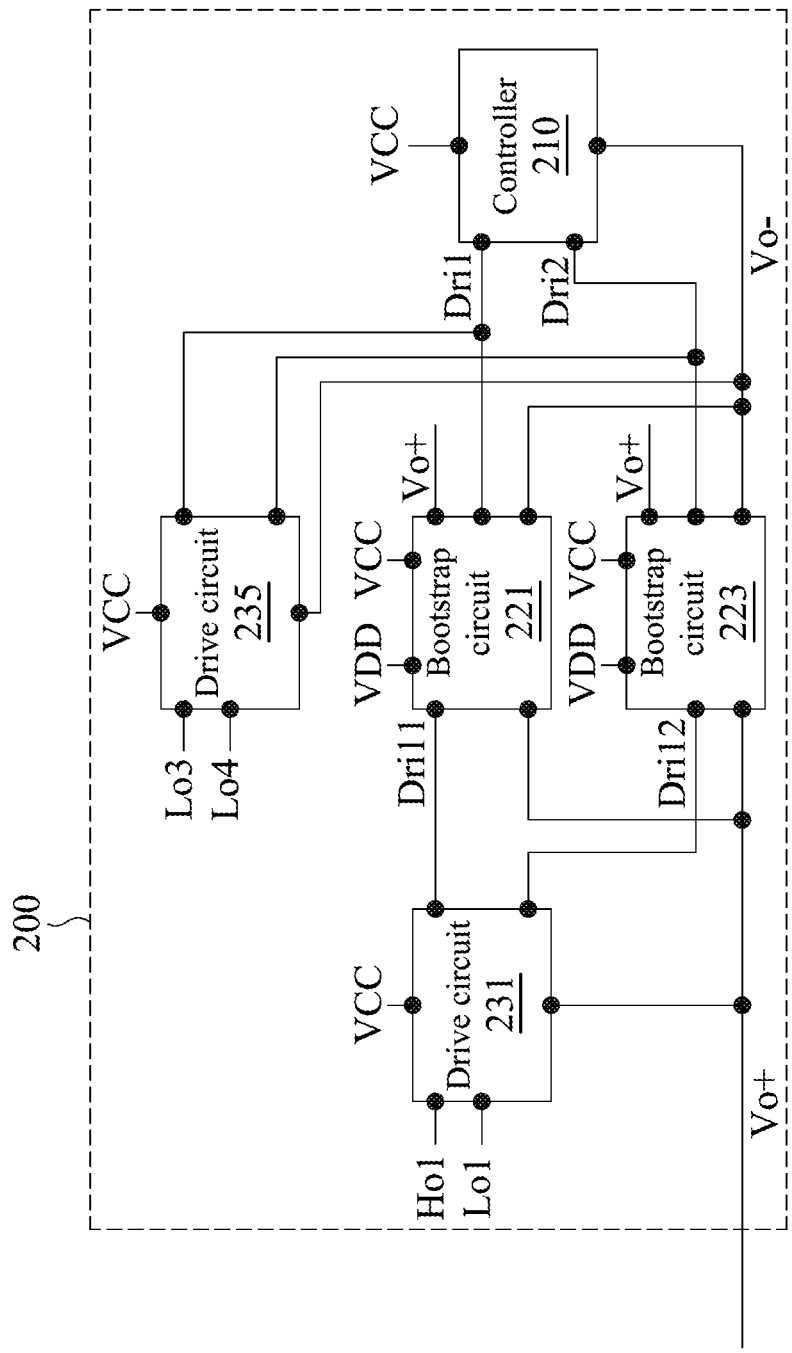
FIG. 9B depicts a schematic diagram of a circuit of a control device of a converter according to one embodiment of the present disclosure.

FIG. 9A depicts a schematic diagram of a circuit of a converter according to still another embodiment of the present disclosure. As shown in FIG. 9A, the primary side may be a half bridge circuit, and the floating pulse width control signals Dri11 and Dri12 are also generated by the bootstrap circuits 221, 223 or the isolation circuits 241, 243 according to the pulse width control signals Dri1 and Dri2 (in the embodiment of FIG. 9B, the bootstrap circuits 221, 223 are taken as an example. However, the present disclosure may adopt the isolation power supply 300 to cooperate with the isolation circuits 241, 243 as shown in FIG. 8). That is, the reference ground is changed from the Vo− terminal on the secondary side to the Vo+ terminal on the secondary side. Then, the drive circuit 231 is used to generate the corresponding drive signals Ho1 and Lo1 to control the turning on and turning off of the upper and lower switches of the half bridge circuit. Reference may be made to the embodiment of FIG. 6A for other components. In addition, the secondary side may be a full wave rectifier circuit or a half wave rectifier circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:
1. A converter for providing power to a load, comprising:
an input capacitor, configured to receive an input voltage;
a primary-side switching circuit, having a DC side and an AC side, the DC side of the primary-side switching circuit being coupled to the input capacitor, the primary-side switching circuit having a switching period and a switching frequency;
a magnetic element circuit, comprising a transformer and an inductor, the magnetic element circuit being directly connected to the AC side of the primary-side switching circuit, wherein the magnetic element circuit does not comprise a discrete capacitor;
a secondary-side switching circuit, coupled to the magnetic element circuit; and
an output capacitor, coupled to the secondary-side switching circuit and connected to the load in parallel;
wherein the input capacitor, the inductor, and the output capacitor oscillate to generate an oscillating current during the switching period, wherein the status of the primary-side switching circuit is switched between a peak point of the oscillating current and a valley point of the oscillating current;
wherein a distribution of capacitance value of the input capacitor is greater than 10%, and an inductance value of the inductor is less than or equal to $150 \times 10^{-9}$ times a ratio of a square of the input voltage to a product of an output voltage and an output power of the converter.
2. The converter of claim 1, wherein the oscillating current comprises an oscillating frequency, and the switching frequency of the primary-side switching circuit is not less than 0.5 time the oscillating frequency and not more than 1 time the oscillating frequency.
3. The converter of claim 1, wherein the oscillating current comprises an oscillating frequency, and the switching frequency of the primary-side switching circuit is not less than 0.5 time the oscillating frequency and not more than two-thirds (⅔) time the oscillating frequency.
4. The converter of claim 1, wherein the inductor is a leakage inductor of the transformer or an inductor independent from the transformer.
5. The converter of claim 1, wherein the transformer of the magnetic element circuit comprises:
at least one magnetic core;
at least one primary-side winding, coupled to the primary-side switching circuit; and
at least one secondary-side winding, coupled to the secondary-side switching circuit, wherein the at least one primary-side winding and the at least one secondary-side winding are coupled through the at least one magnetic core.

6. The converter of claim 1, wherein the primary-side switching circuit comprises a full bridge circuit.

7. The converter of claim 1, wherein the at least one secondary-side winding of the transformer comprises at least two windings, wherein the at least two windings are connected in series with each other, and a connection point of the at least two windings comprises a center tap, wherein the at least one secondary-side winding of the transformer and the secondary-side switching circuit form a center-tapped full wave rectifier circuit.

8. The converter of claim 1, wherein the secondary-side switching circuit comprises a full bridge rectifier circuit.

9. The converter of claim 1, further comprising:
a control circuit, configured to generate a set of complementary drive signals so as to control the primary-side switching circuit, a Duty cycle of each of the set of complementary drive signals being substantial 50%, and a dead zone existing between two adjacent drive signals.

10. The converter of claim 9, wherein when a voltage across two terminals of a switch of the primary-side switching circuit is less than or equal to half of the input voltage, the control circuit controls the primary-side switching circuit.

11. The converter of claim 9, wherein when a voltage across two terminals of a switch of the primary-side switching circuit is equal to zero, the control circuit controls the primary-side switching circuit.

12. The converter of claim 1, further comprising:
an input inductor, receiving the input voltage together with the input capacitor, an inductance value of the input inductor being greater than or equal to 5 times an inductance value of a leakage inductor of the transformer.

13. A converter for providing power to a load, comprising:
an input capacitor;
a primary-side switching circuit, having a DC side and an AC side, the DC side of the primary-side switching circuit being coupled to the input capacitor, the primary-side switching circuit having a switching period and a switching frequency;
a magnetic element circuit, comprising a transformer and an inductor, the magnetic element circuit being coupled to the AC side of the primary-side switching circuit;
a secondary-side switching circuit, coupled to the magnetic element circuit; and
an output capacitor, coupled to the secondary-side switching circuit and connected to the load in parallel;
wherein the input capacitor, the inductor, and the output capacitor oscillate to generate an oscillating current during the switching period, wherein the status of the primary-side switching circuit is switched between a peak point of the oscillating current and a valley point of the oscillating current, and the primary-side switching circuit comprises:
a first positive voltage terminal, coupled to one terminal of the input voltage; and
a first negative voltage terminal;
wherein the secondary-side switching circuit comprises:
a second positive voltage terminal, coupled to the first negative voltage terminal; and
a second negative voltage terminal, outputting an output voltage together with the second positive voltage terminal, wherein the second negative voltage terminal is coupled to another terminal of the input voltage;
wherein the converter further comprises:
a control device, comprising:
a controller, configured to output at least one pulse width modulation signal, wherein a reference ground of the pulse width modulation signal is the second negative voltage terminal;
at least one bootstrap circuit, configured to generate at least one control signal and at least one second power supply signal based on the at least one pulse width control signal and at least one first power supply signal, wherein a reference ground of the control signal is the second positive voltage terminal;
at least one first drive circuit, configured to generate at least one first drive signal based on the at least one control signal and the at least one second power supply signal to control the primary-side switching circuit; and
at least one second drive circuit, configured to generate at least one second drive signal based on the at least one pulse width modulation signal and the at least one first power supply signal to control the second-side switching circuit.

14. The converter of claim 13, wherein the primary-side switching circuit comprises a half bridge circuit.

15. A converter for providing power to a load, comprising:
an input capacitor;
a primary-side switching circuit, having a DC side and an AC side, the DC side of the primary-side switching circuit being coupled to the input capacitor, the primary-side switching circuit having a switching period and a switching frequency;
a magnetic element circuit, comprising a transformer and an inductor, the magnetic element circuit being coupled to the AC side of the primary-side switching circuit;
a secondary-side switching circuit, coupled to the magnetic element circuit; and
an output capacitor, coupled to the secondary-side switching circuit and connected to the load in parallel;
wherein the input capacitor, the inductor, and the output capacitor oscillate to generate an oscillating current during the switching period, wherein the status of the primary-side switching circuit is switched between a peak point of the oscillating current and a valley point of the oscillating current, and the primary-side switching circuit comprises:
a first positive voltage terminal, coupled to one terminal of the input voltage; and
a first negative voltage terminal;
wherein the secondary-side switching circuit comprises:
a second positive voltage terminal, coupled to the first negative voltage terminal; and
a second negative voltage terminal, outputting an output voltage together with the second positive voltage terminal, wherein the second negative voltage terminal is coupled to another terminal of the input voltage;
wherein the converter further comprises:
a control device, comprising:
a controller, configured to output at least one pulse width modulation signal, wherein a reference ground of the pulse width modulation signal is the second negative voltage terminal;
at least one isolation power supply, configured to provide at least one first power supply signal and at least one second power supply signal;
at least one isolation circuit, configured to generate at least one control signal based on the at least one first power supply signal and the at least one pulse width control signal, wherein a reference ground of the control signal is the second positive voltage terminal;

at least one first drive circuit, configured to generate at least one first drive signal based on the at least one control signal and the at least one second power supply signal to control the primary-side switching circuit; and at least one second drive circuit, configured to generate at least one second drive signal based on the at least one pulse width modulation signal and the at least one first power supply signal to control the second-side switching circuit.

16. The converter of claim 15, wherein the primary-side switching circuit comprises a half bridge circuit.

* * * * *